US008423100B2

(12) United States Patent
Wong et al.

(10) Patent No.: US 8,423,100 B2
(45) Date of Patent: Apr. 16, 2013

(54) MOBILE COMMUNICATION DEVICE WITH LOW NEAR-FIELD RADIATION AND RELATED ANTENNA STRUCTURE

(75) Inventors: Kin-Lu Wong, Tapei Hsien (TW); Chih-Hua Chang, Tapei Hsien (TW)

(73) Assignee: Acer Inc., Taipei Hsien (TW)

( * ) Notice: Subject to any disclaimer, the term of this patent is extended or adjusted under 35 U.S.C. 154(b) by 412 days.

(21) Appl. No.: 12/797,757

(22) Filed: Jun. 10, 2010

(65) Prior Publication Data

US 2011/0223858 A1 Sep. 15, 2011

(30) Foreign Application Priority Data

Mar. 11, 2010 (TW) ............................... 99107160 A

(51) Int. Cl.
*H04M 1/00* (2006.01)

(52) U.S. Cl.
USPC .................... 455/575.7; 455/90.3; 455/575.5; 343/702; 343/745; 343/861

(58) Field of Classification Search ............... 455/575.7, 455/90.3, 575.5; 343/702, 745, 861
See application file for complete search history.

(56) References Cited

U.S. PATENT DOCUMENTS 5,231,407 A * 7/1993 McGirr et al. .......... 343/700 MS
7,663,555 B2 * 2/2010 Caimi et al. .................. 343/702

* cited by examiner

*Primary Examiner* — April G Gonzales
(74) *Attorney, Agent, or Firm* — Alan Kamrath; Kamrath IP Lawfirm, P.A.

(57) ABSTRACT

A mobile communication device includes an antenna structure. The antenna structure includes a circuit board. A ground plane is disposed on the second surface of the circuit board and includes a first side edge and a second side edge. An antenna element is disposed on the first surface of the circuit board or placed near the circuit board, and includes a first operating band and a second operating band. A first inductively-coupled element is located near the first side edge of the ground plane, and includes a metal plate and an inductive element. The metal plate is electrically connected to the ground plane through the inductive element. The first inductively-coupled element generates a resonant mode at a specific frequency within the second operating band to reduce a surface current excitation on the ground plane and to reduce near-field E-field and H-field strengths of the mobile communication device within the second operating band.

16 Claims, 5 Drawing Sheets

MOBILE COMMUNICATION DEVICE WITH LOW NEAR-FIELD RADIATION AND RELATED ANTENNA STRUCTURE

BACKGROUND OF THE INVENTION

1. Field of the Invention

The present invention relates to a mobile communication device and a related antenna structure and, more particularly, to a mobile communication device with low near-field radiation and a related antenna structure.

2. Description of the Related Art

With the development of wireless communication technology, the wireless communication products are increasingly ubiquitous. Mobile communication devices, especially the mobile phone, are inextricably linked to people's lives today. In the performance of current mobile phone antennas, the antenna's operating bandwidth and its far-field radiation efficiency are considered. The near-field E-field and H-field strengths of the antenna also recently become important design considerations for practical applications.

The Federal Communications Commission (FCC) stipulates that mobile phones sold in the US must meet the standard of hearing aid compatibility (HAC). That standard is used for restricting the near-field E-field and H-field strengths of the mobile phone antenna in order to prevent the interference of the mobile phone antenna to a user wearing a hearing aid during operation of the mobile phone. According to the standard, the strengths of the near-field E-field and H-field must be restricted under the different operating bands of the mobile phone antenna.

In general, with a bar-type mobile phone, the restriction of the near-field E-field and H-field strengths to the low frequency bands of GSM850/900 (824~960 MHz) is less stringent, and the high frequency band of UMTS (1920~2170 MHz) is used at a lower maximum output power (about 0.125 W). Therefore, the three operating bands abovementioned can meet the requirements of the HAC standard. Unlike the abovementioned three operating bands, the high frequency bands of GSM1800/1900 (1710~1990 MHz) cannot meet the requirements of the HAC standard. In the mobile phone antenna in the prior art, the near-field E-field and H-field strengths cannot be reduced by adjusting the antenna structure. Therefore, the mobile phone antenna in the prior art cannot be considered as an HAC mobile device, because it does not meet the standard of hearing aid compatibility.

Therefore, it is desirable to provide a mobile communication device with low near-field radiation and a related antenna structure to mitigate and/or obviate the aforementioned problems.

SUMMARY OF THE INVENTION

A main objective of the present invention is to provide a mobile communication device with low near-field radiation using an inductively-coupled element to generate a resonant mode at a specific frequency within 1710~1990 MHz and to reduce the surface current on the ground plane, especially that around an acoustic output located at the other end of a circuit board. Therefore, the near-field E-field and H-field strengths within the GSM1800/1900 operating bands of the mobile communication device will be reduced. The mobile communication device of the present invention is able to reduce the near-field E-field and H-field strengths within the GSM1800/1900 operating bands to satisfy the HAC standard without changing the structure and the size of the antenna. Furthermore, the size of the inductively-coupled element is capable of being disposed in the mobile communication device without affecting the overall size of the mobile communication device.

Another main objective of the present invention is to provide an antenna structure using an inductively-coupled element to generate a resonant mode at a specific frequency within 1710~1990 MHz and to reduce the surface current on the ground plane, especially that around an acoustic output located at the other end of a circuit board. Therefore, the near-field E-field and H-field strengths within the GSM1800/1900 operating bands of the mobile communication device will be reduced. The mobile communication device of the present invention is able to reduce the near-field E-field and H-field strengths within the GSMI800/1900 operating bands to satisfy the HAC standard without changing the structure and the size of the antenna. Furthermore, the size of the inductively-coupled element is capable of being disposed in the mobile communication device without affecting the overall size of the mobile communication device.

In order to achieve the abovementioned main objective, the mobile communication device with low near-field radiation of the present invention includes an antenna structure. The antenna structure includes a circuit board, a ground plane, an antenna element, and a first inductively-coupled element. The circuit board has a first surface and a second surface opposite to the first surface. The ground plane is disposed on the second surface of the circuit board and includes a first side edge and a second side edge opposite to the side edge. The antenna element is disposed on the first surface of the circuit board or placed near the circuit board, and includes a first operating band and a second operating band. The first inductively-coupled element is disposed on the first surface of the circuit board and located near the first side edge of the ground plane, and includes a metal plate and an inductive element. The metal plate is electrically connected to the ground plane through the inductive element. The first inductively-coupled element generates a resonant mode at a specific frequency within the second operating band in order to reduce a surface current excitation on the ground plane and reduces near-field E-field and H-field strengths of the mobile communication device within the second operating band.

In order to achieve that another main objective, the antenna structure includes a circuit board, a ground plane, an antenna element, and a first inductively-coupled element. The circuit board has a first surface and a second surface opposite to the first surface. The ground plane is disposed on the second surface of the circuit board and includes a first side edge and a second side edge opposite to the side edge. The antenna element is disposed on the first surface of the circuit board or placed near the circuit board, and includes a first operating band and a second operating band. The first inductively-coupled element is disposed on the first surface of the circuit board and located near the first side edge of the ground plane, and includes a metal plate and an inductive element. The metal plate is electrically connected to the ground plane through the inductive element. The first inductively-coupled element generates a resonant mode at a specific frequency within the second operating band in order to reduce a surface current excitation on the ground plane and reduces near-field E-field and H-field strengths of the mobile communication device within the second operating band.

According to one embodiment of the present invention, the inductive element is a chip inductor. The first inductively-coupled element is disposed on a dielectric substrate, and the dielectric substrate is substantially perpendicular to the circuit board. The inductively-coupled elements can be used as two elements and are individually disposed on the two side edges of the ground plane.

Other objectives, advantages, and novel features of the invention will become more apparent from the following detailed description when taken in conjunction with the accompanying drawings.

DETAILED DESCRIPTION OF THE PREFERRED EMBODIMENTS

The advantages and innovative features of the invention will become more apparent from the following descriptions of the preferred embodiments.

Figure 1:
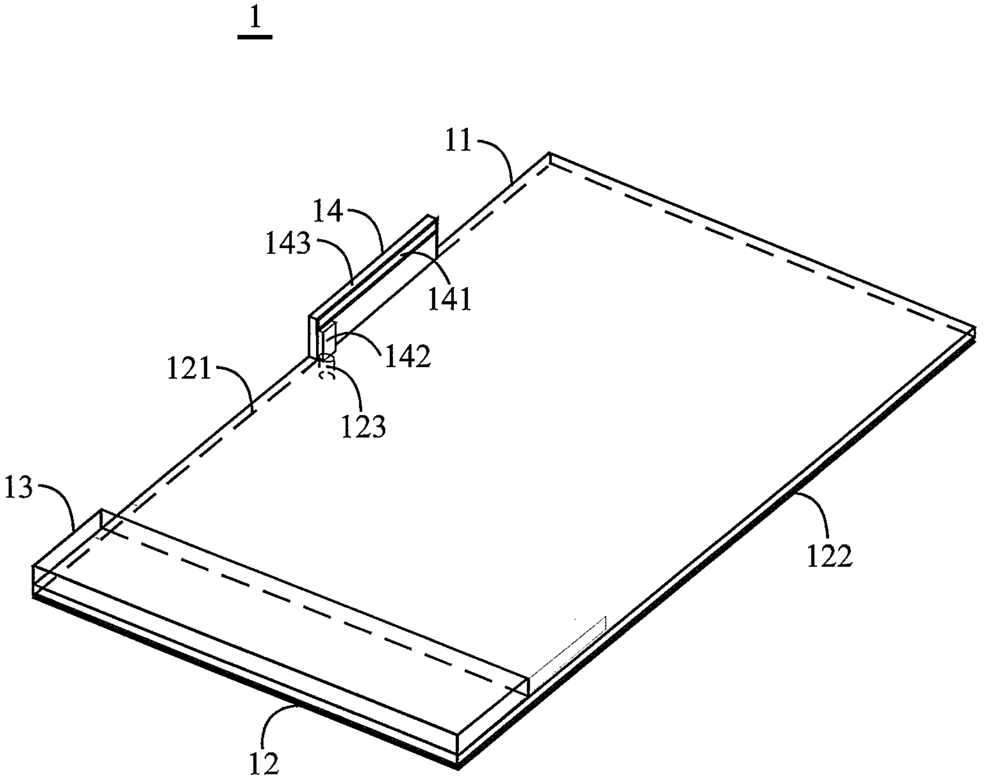
FIG. 1 is a perspective drawing of a mobile communication device with low near-field radiation and its antenna structure according to a first embodiment of the present invention.

FIG. 1 is a perspective drawing of a mobile communication device with low near-field radiation and its antenna structure according to a first embodiment of the present invention. The mobile communication device 1 includes an antenna structure, and the antenna structure includes a circuit board 11, a ground plane 12, an antenna element 13, and a first inductively-coupled element 14. The circuit board 11 includes a first surface and a second surface opposite to the first surface. The ground plane 12 is disposed on the second surface of the circuit board 11 and includes a first side edge 121 and a second side edge 122 opposite to the first side edge 121. The antenna element 13 is disposed on the first surface of the circuit board 11 and provides a first operating band (i.e., 824~960 MHz) and a second operating band (i.e., 1710~1990 MHz). In this embodiment, the first inductively-coupled element 14 is disposed on the first side edge 121 of the ground plane 12 and includes a metal plate 141 and an inductive element 142. The metal plate 141 electrically connects to the ground plane 12 through the inductive element 142. The first inductively-coupled element 142 generates a resonant mode at a specific frequency within the second operating band 42 in order to reduce a surface current excitation on the ground plane 12 and reduces near-field E-field and H-field strengths of the mobile communication device 1 with low near-field radiation within the second operating band 42. The inductive element 142 can be a chip inductor. In the present embodiment, the first inductively-coupled element 14 is disposed on a dielectric substrate 143, and the dielectric substrate 143 is substantially perpendicular to the circuit board 11. Furthermore, in this embodiment, an area of the antenna element 13 is smaller than an area of the ground plane 12, and the antenna element 13 at least partially overlaps the ground plane 12.

Figure 2:
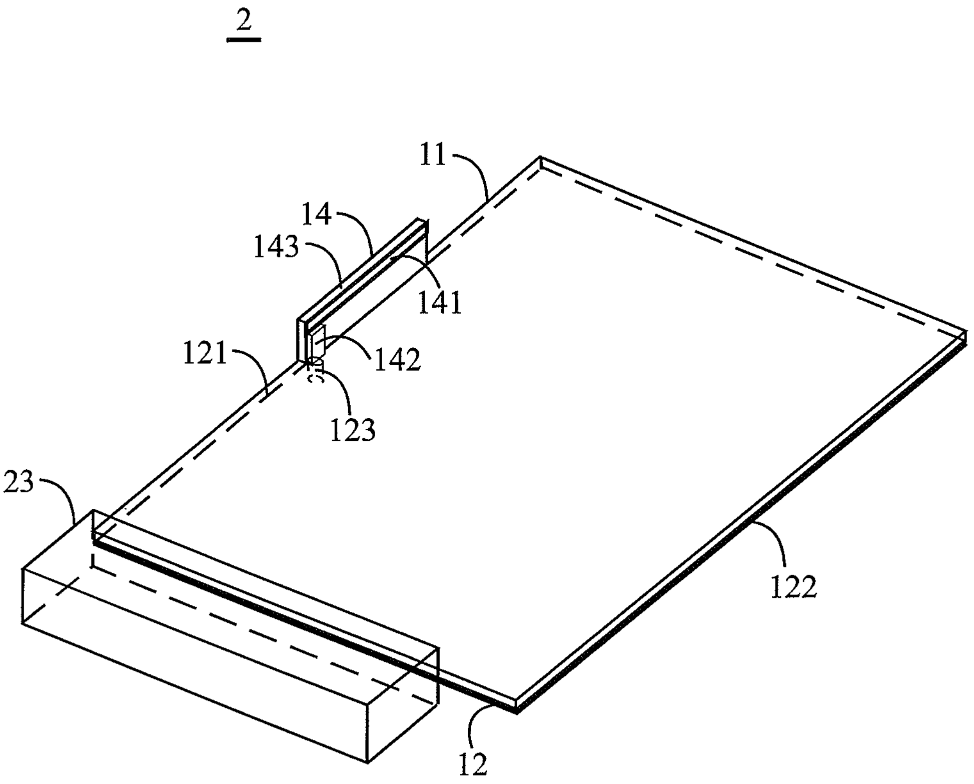
FIG. 2 is a perspective drawing of a mobile communication device with low near-field radiation and its antenna structure according to a second embodiment of the present invention.

FIG. 2 is a perspective drawing of a mobile communication device 2 with low near-field radiation according to a second embodiment of the present invention. The mobile communication device 2 with low near-field radiation includes a circuit board 11, a ground plane 12, an antenna element 23, and a first inductively-coupled element 14. The structure of the mobile communication device 2 with low near-field radiation in the second embodiment is similar to that of the first embodiment, the major difference being that the antenna element 23 is placed near the circuit board 11 and is not disposed on the circuit board 11. The performances of the second embodiment are similar to those of the first embodiment mentioned above.

Figure 3:
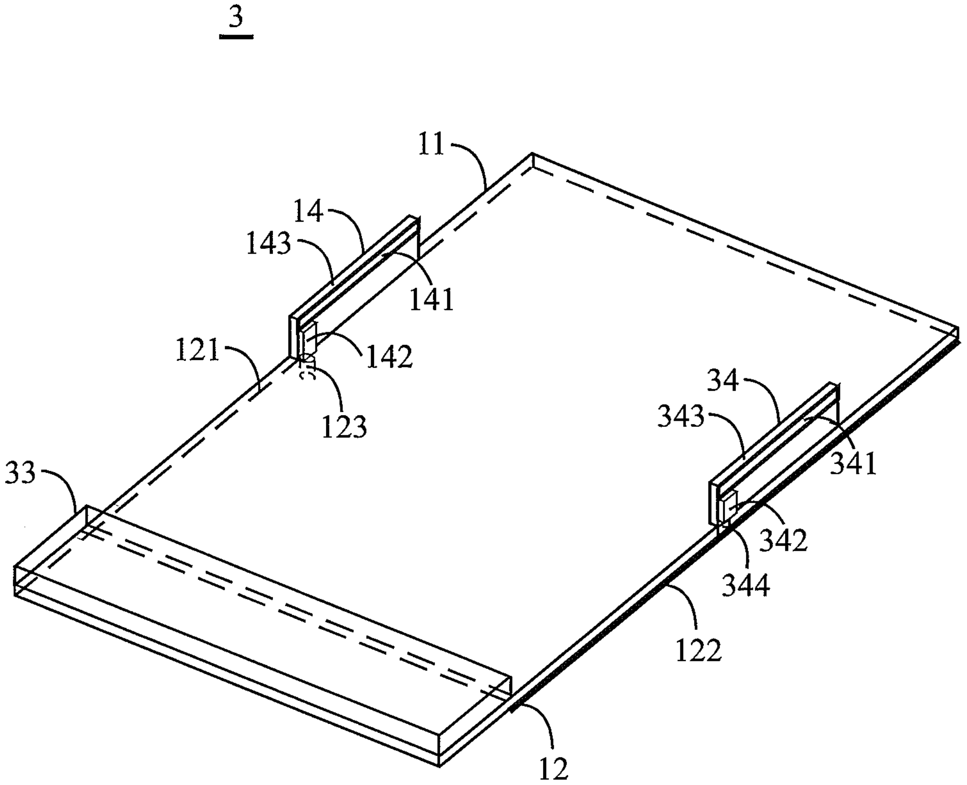
FIG. 3 is a perspective drawing of a mobile communication device with low near-field radiation and its antenna structure according to a third embodiment of the present invention.

FIG. 3 is a perspective drawing of a mobile communication device 3 with low near-field radiation according to a third embodiment of the present invention. The mobile communication device 3 with low near-field radiation includes a circuit board 11, a ground plane 12, an antenna element 33, a first inductively-coupled element 14, and a second inductively-coupled element 34. The structure of the mobile communication device 3 with low near-field radiation is similar to that of the first embodiment, with the significant difference being that the antenna element 33 is disposed on the circuit board 11 and does not overlap the ground plane 12. In the third embodiment, the mobile communication device 3 with low near-field radiation has two inductively-coupled elements, the first inductively-coupled element 14 and the second inductively-coupled element 34. The second inductively-coupled element 34 includes a metal plate 341 and an inductive element 342 and is disposed on a dielectric substrate 343. The first inductively-coupled element 14 and the second inductively-coupled element 34 are disposed on the first surface of the circuit board 11 and located near the first side edge 121 and the second side edge 122 of the ground plane 12 respectively and are electrically connected to the ground plane 12 through a first connection element and a second connection element respectively. In this embodiment, the first inductively-coupled element 14 is electrically connected to the ground plane 12 through the first connection element, and the second inductively-coupled element 34 is electrically connected to the ground plane 12 through the second connection element. Furthermore, the first connection element is implemented by a via-hole 123, and the second connection element is implemented by a metal wire 344. However, this in no way should be limitations of the present invention. The performances of the third embodiment are similar to those of the first embodiment mentioned above.

Figure 4:
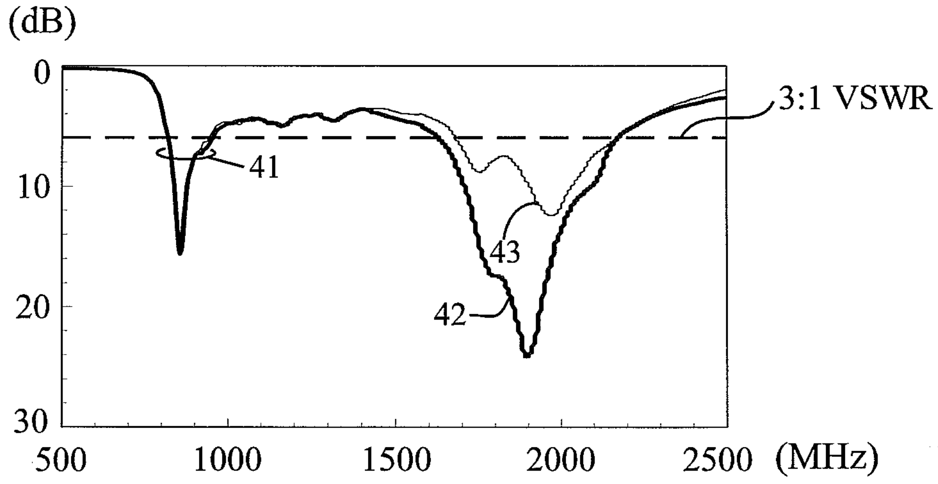
FIG. 4 shows a return loss of the mobile communication device with low near-field radiation of the third embodiment of the present invention.

FIG. 4 shows a return loss according to the mobile communication device with low near field radiation of the third embodiment of the present invention. The third embodiment is simulated in the following size: The length of the circuit board 11 is about 115 mm, and the width is about 40 mm; the length of ground plane 12 is about 100 mm, and the width is about 40 mm; the area of the antenna element 33 is 31×15 mm2; and the overall size of the first inductively-coupled element 14 is 3×16 mm2. Therefore, the first inductively-coupled element 14 is able to be disposed in the mobile communication device, and the overall size of the mobile communication device will not be changed. The first inductively-coupled element 14 includes a metal plate 141, which is 2×16 mm2, and an inductive element 142, which is a chip inductor of 4.7 nH. The size of the second inductively-coupled element 34 is generally the same as that of the first inductively-coupled element 14.

According to the experimental results in FIG. 4 and the comparison with a second operating band 42 of the third embodiment and a second operating band 43, which indicates the third embodiment without the inductively-coupled element, a resonant mode is generated at about a high frequency of 1900 MHz if the first inductively-coupled element 14 and the second inductively-coupled element 34 are disposed. Besides, the first operating band 41 will not be affected when the first inductively-coupled element 14 and the second inductively-coupled element 34 are disposed.

Figure 5:
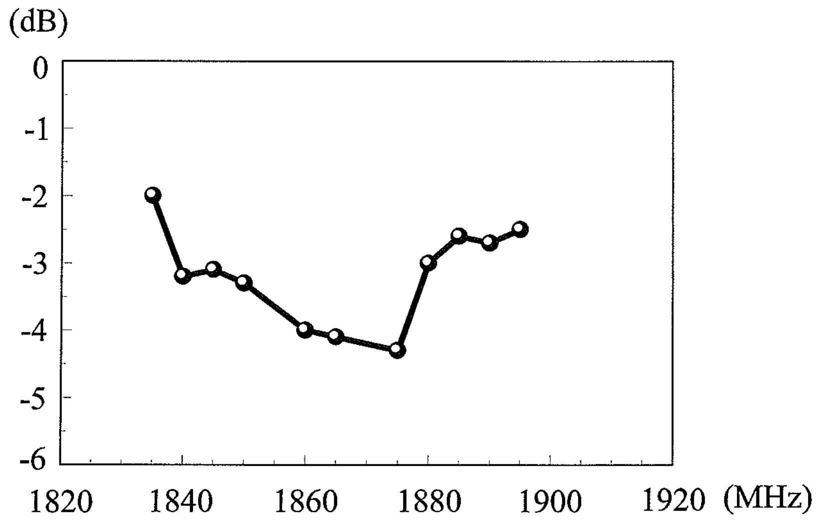
FIG. 5 shows a simulation result of the reduced near-field E-field strength of the mobile communication device with low near-field radiation of the third embodiment of the present invention.

FIG. 5 shows a simulation result of the reduced near-field E-field strength of the mobile communication device with low near-field radiation of the third embodiment of the present invention (i.e., a comparison with the mobile communication device without the inductively-coupled element). According to the simulation results, when the first inductively-coupled element 14 and the second inductively-coupled element 34 are disposed, the near-field E-field strength within the second operating band is reduced by about 4.3 dB (i.e., a decrease of 63%).

Figure 6:
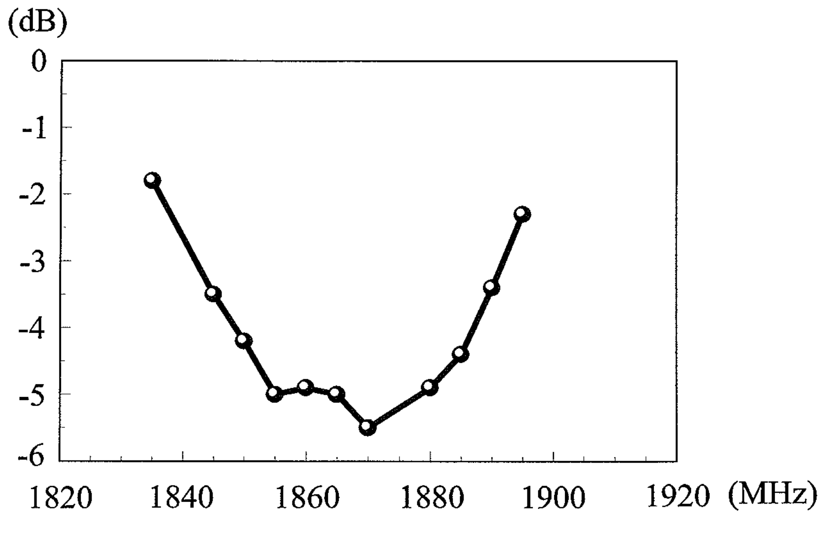
FIG. 6 shows a simulation result of the reduced near-field H-field strength of the mobile communication device with low near-field radiation of the third embodiment of the present invention.

FIG. 6 shows a simulation result of the near-field H-field strength reducing according to the mobile communication device with low near-field radiation of the third embodiment of the present invention (i.e., a comparison with the mobile communication device without the inductively-coupled element). According to the simulation results, when the first inductively-coupled element 14 and the second inductively-coupled element 34 are disposed, the near-field H-field strength within the second operating band is reduced by about 5.5 dB (i.e., a decrease of 72%). Therefore, the mobile communication device with low near-field radiation of the present invention is capable of achieving a low near-field radiation.

As a result, according to the mobile communication devices 1, 2 and 3 with low near-field radiation of the present invention, the first inductively-coupled element 14 and the second inductively-coupled element 34 used in a small size are capable of generating the resonant mode at a specific frequency (for example, between 1710~1990 MHz) through an inductance provided by the inductive elements 142, 342 and reducing a surface current excitation on the ground plane 12 to reduce the near-field E-field and H-field strengths of the mobile communication devices 1, 2 and 3 with low near-field radiation.

Although the present invention has been explained in relation to its preferred embodiments, it is to be understood that many other possible modifications and variations can be made without departing from the spirit and scope of the invention as hereinafter claimed.

What is claimed is:

1. A mobile communication device with low near-field radiation, comprising an antenna structure, with the antenna structure comprising:
- a circuit board having a first surface and a second surface opposite to the first surface;
- a ground plane disposed on the second surface of the circuit board and comprising a first side edge and a second side edge opposite to the first side edge;
- an antenna element disposed on the first surface of the circuit board or placed near the circuit board, with the antenna element comprising a first operating band and a second operating band; and
- a first inductively-coupled element disposed on the first surface of the circuit board and located near the first side edge of the ground plane, with the first inductively-coupled element comprising a metal plate and an inductive element, wherein the metal plate is electrically connected to the ground plane through the inductive element; wherein the first inductively-coupled element generates a resonant mode at a specific frequency within the second operating band in order to reduce a surface current excitation on the ground plane and to reduce near-field E-field and H-field strengths of the mobile communication device within the second operating band.

2. The mobile communication device as claimed in claim 1, wherein the first inductively-coupled element is disposed on a dielectric substrate, and wherein the dielectric substrate is substantially perpendicular to the circuit board.

3. The mobile communication device as claimed in claim 1, further comprising a connection element, and wherein the first inductively-coupled element is electrically connected to the ground plane through the connection element.

4. The mobile communication device as claimed in claim 1, further comprising a second inductively-coupled element disposed on the first surface of the circuit board and located near the second side edge of the ground plane.

5. The mobile communication device as claimed in claim 4, further comprising a connection element, and wherein the second inductively-coupled element is electrically connected to the ground plane through the connection element.

6. The mobile communication device as claimed in claim 1, wherein the first operating band comprises 824 to 960 MHz.

7. The mobile communication device as claimed in claim 1, wherein the second operating band comprises 1710 to 1990 MHz.

8. The mobile communication device as claimed in claim 1, wherein the antenna element does not overlap the ground plane.

9. The mobile communication device as claimed in claim 1, wherein an area of the antenna element is smaller than an area of the ground plane; and wherein the antenna element at least partially overlaps the ground plane.

10. An antenna structure comprising:
- a circuit board having a first surface and a second surface opposite to the first surface;
- a ground plane disposed on second surface of the circuit board and comprising a first side edge and a second side edge opposite to the first side edge;
- an antenna element disposed on the first surface of the circuit board or placed near the circuit board, with the antenna element comprising a first operating band and a second operating band; and
- a first inductively-coupled element disposed on the first surface of the circuit board and located near the first side edge of the ground plane, wherein the first inductively-coupled element is electrically connected to the ground plane, wherein the first inductively-coupled element generates a resonant mode at a specific frequency within the second operating band in order to reduce a surface current excitation on the ground plane and to reduce near-field E-field and H-field strengths of the antenna structure within the second operating band.

11. The antenna structure as claimed in claim 10, wherein the first inductively-coupled element is disposed on a dielectric substrate, and wherein the dielectric substrate is substantially perpendicular to the circuit board.

12. The antenna structure as claimed in claim 10, further comprising a connection element, and wherein the first inductively-coupled element is electrically connected to the ground plane through the connection element.

13. The antenna structure as claimed in claim 10, further comprising a second inductively-coupled element disposed on the first surface of the circuit board and located near the second side edge of the ground plane.

14. The antenna structure as claimed in claim 13, further comprising a connection element, and wherein the second inductively-coupled element is electrically connected to the ground plane through the connection element.

15. The antenna structure as claimed in claim 10, wherein the antenna element does not overlap the ground plane.

16. The antenna structure as claimed in claim 10, wherein an area of the antenna element is smaller than an area of the ground plane; and wherein the antenna element at least partially overlaps the ground plane.

* * * * *